United States Patent
Peiro et al.

(10) Patent No.: US 7,434,160 B2
(45) Date of Patent: Oct. 7, 2008

(54) PDF DOCUMENT TO PPML TEMPLATE TRANSLATION

(75) Inventors: Jose Abad Peiro, Sant Cugat (ES); Luca Chiarabini, Sant Cugat (ES); Petar Obradovic, Camas, WA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 550 days.

(21) Appl. No.: 10/726,917

(22) Filed: Dec. 3, 2003

(65) Prior Publication Data
US 2005/0125728 A1 Jun. 9, 2005

(51) Int. Cl.
G06F 17/00 (2006.01)
H04N 1/60 (2006.01)

(52) U.S. Cl. .................. 715/249; 715/236; 715/255; 358/1.9; 358/451

(58) Field of Classification Search ............... 715/523, 715/513, 517, 526, 200, 234–236, 239, 249, 715/251, 256, 274, 276; 358/1.13, 1.15, 358/1.1, 1.2, 1.9, 2.1, 451, 452, 453, 523, 358/537
See application file for complete search history.

(56) References Cited

U.S. PATENT DOCUMENTS

| | | | | |
|---|---|---|---|---|
| 5,983,243 | A * | 11/1999 | Heiney et al. | 715/500 |
| 5,995,724 | A * | 11/1999 | Mikkelsen et al. | 358/1.16 |
| 6,134,018 | A * | 10/2000 | Dziesietnik et al. | 358/1.15 |
| 6,243,172 | B1 * | 6/2001 | Gauthier et al. | 358/1.18 |
| 6,441,919 | B1 * | 8/2002 | Parker et al. | 358/1.18 |
| 6,476,931 | B1 * | 11/2002 | Aizikowitz et al. | 358/1.18 |
| 6,547,831 | B1 * | 4/2003 | Kueny | 715/522 |
| 6,844,940 | B2 * | 1/2005 | Warmus et al. | 358/1.18 |
| 6,952,801 | B2 * | 10/2005 | Warmus et al. | 715/525 |
| 7,020,837 | B1 * | 3/2006 | Kueny | 715/513 |
| 7,391,529 | B2 * | 6/2008 | Glaspy et al. | 358/1.18 |
| 2002/0049702 | A1 * | 4/2002 | Aizikowitz et al. | 707/1 |
| 2002/0111963 | A1 * | 8/2002 | Gebert et al. | 707/513 |
| 2003/0076535 | A1 * | 4/2003 | Prosi | 358/1.16 |
| 2003/0107766 | A1 * | 6/2003 | Ramot et al. | 358/1.18 |
| 2003/0142334 | A1 * | 7/2003 | Currans et al. | 358/1.13 |

(Continued)

FOREIGN PATENT DOCUMENTS

JP 2002140322 5/2002

(Continued)

OTHER PUBLICATIONS

Dirk De Bosschere, "Book Ticket Files & Imposition templates for variable data printing", Barco Graphics—Digital Printing Systems, Mar. 2000, pp. 1-11.*

(Continued)

*Primary Examiner*—Doug Hutton
*Assistant Examiner*—Maikhanh Nguyen

(57) ABSTRACT

A system and method of operation is configured to produce a PPML template from a PDF document. In one implementation, the system opens the PDF document and converts PDF elements within the PDF document into variable objects. A macro is generated, which contains rules governing use and reuse of the variable objects. The PPML template generated as final result is configured to include a definition of the variable objects, the macro and a version of the original PDF document, wherein at least portions of the PDF document are configured as a background element within the PPML document.

17 Claims, 16 Drawing Sheets

U.S. PATENT DOCUMENTS

| | | | |
|---|---|---|---|
| 2003/0159105 A1* | 8/2003 | Hiebert | 715/500 |
| 2003/0189726 A1* | 10/2003 | Kloosterman et al. | 358/1.18 |
| 2004/0004625 A1* | 1/2004 | Chao | 345/622 |
| 2004/0083430 A1* | 4/2004 | Boonen | 715/523 |
| 2005/0162692 A1* | 7/2005 | Sano et al. | 358/1.15 |

FOREIGN PATENT DOCUMENTS

| | | | |
|---|---|---|---|
| JP | 2003523022 | | 7/2003 |
| JP | 2003316548 | | 11/2003 |
| JP | 2003316549 | | 11/2003 |
| JP | 2004252665 | | 9/2004 |
| JP | 2005122728 | | 5/2005 |
| WO | WO 98/08176 | A1 * | 2/1998 |
| WO | WO 99/17539 | A1 * | 4/1999 |
| WO | WO 00/62178 | * | 10/2000 |

OTHER PUBLICATIONS

Anonymous, "PPML/VDX: Enabling variable-data printing", America Printer, Oct. 2002, vol. 230, No. 1, pp. 44.*

"Introduction to the Personalized Print Markup Language: The PPML Family of XML Standards", PODi, Jul. 2003, pp. 1-8.*

Bagley et al., "Creating Reusable Well-Structured PDF as a Sequence of Component Object Graphic 'COG' Elements", ACM, Nov. 2003, pp. 58-66.*

Dave deBoronkart, "The PPML Print Language in XML Workfows for Digital Print," Internationales Congress Centrum, Berlin, Germany, May 2001, pp. 1-5.*

CGATS.20-200x, Graphic Technology—Variable printing data exchange using PPML and PDF (PPML/VDX), Draft #13, Jan. 21, 2002.*

PPML Function Specification, Version 1.5, May 31, 2001.*

D. deBronkart, "PPML (Personalized Print Markup Language)—a new XML-based industry standard print language", Mar. 15, 2000, pp. 1-14.*

Durkin; www.think121.com; 1 pg.

Anonymous, "Argon PPML/PDF", PODI Techinical Meeting, Nov. 6, 2000 to Nov. 8, 2000, Orlando, FL, retrieved from the internet at http://think121.com/new/technical/argon/argon_public.pdf on Nov. 26, 2007.

Anonymous, "pdfExpress", www.think121.com, Feb. 2, 2001, retrieved from the internet at http://web.archive.org/web/20010202195000/http://think121.com, retrieved on Nov. 20, 2007.

Cover, "Pageflex Persona Publishing Application Supports Personalized Print Markup Language (PPML)", WML. coverpages.org, Jan. 12, 2002, retrieved from the internet at http://xml.coverpages.org/ni2002-01-12-a.html on Nov. 20, 2007.

Japanese Patent Office Notice of Rejection, Pat #2004-345478, Jun. 11, 2007, 4 pgs.

* cited by examiner

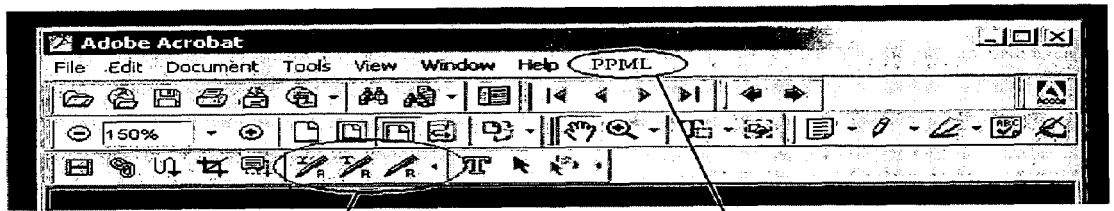
214--218
302
Fig. 3
214  218
216
Fig. 4
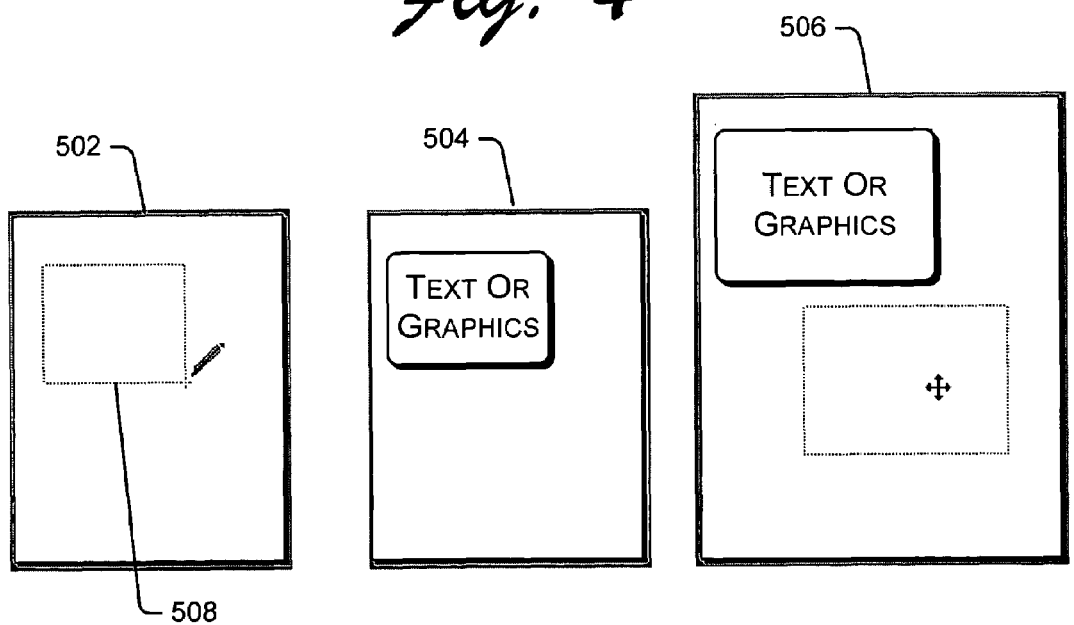
Fig. 5

228 PPML To PDF Converter

1802 PPML Document Interpretation Component

1804 Parsing And Tagging Component

1806 PPML Source_Type Class Resolving Component

1808 Translation Component

1810 PDF Tree Generating Component

1812 Un-Marshalling Component

1814 SourceResolver Interface Component

1816 FontResolver Interface Component

1818 OccurrenceStore Interface Component

1820 ImpositionStore Interface Component

*Fig. 18*

PDF DOCUMENT TO PPML TEMPLATE TRANSLATION

RELATED APPLICATIONS

This patent application is related to U.S. patent application Ser. No. 10/727,240, titled "PPML to PDF Conversion", filed on Dec. 3, 2003, commonly assigned herewith, and hereby incorporated by reference. This patent application is also related to U.S. patent application Ser. No. 10/727,241, titled "Variable Data Print Engine", filed on Dec. 3, 2003, commonly assigned herewith, and hereby incorporated by reference.

BACKGROUND

Graphic artists have a number of well-known tools for use in the generation of content. QuarkXPress™, Adobe® InDesign® and Adobe® PageMaker® all provide the author with tools to facilitate the generation of content for use in documents. However, authors face difficulty in that the output—such as PDF and Adobe® PostScript®—produced by many authoring programs is inefficient in circumstances requiring the output of large numbers of different documents.

PPML (personalized print markup language) is an XML-based language for variable-data printing. Accordingly, PPML is useful when printing large numbers of different documents, e.g. large numbers of custom-printed advertisements. Conventionally, PPML is used when printing to very fast high-end printers, such as digital presses (e.g. the HP Indigo Digital Press 1000), since the rapid speed with which such printers operate does not allow for each job to be individually transmitted and processed, such as where the jobs are transmitted in an Adobe® Acrobat® PDF (portable document format) file format.

However, the generation of PPML documents and PPML templates is a complex process. The graphic artist, who may chose from among a number of content-authoring programs with which to generate the content, is faced with the difficult task of generating PPML templates (PPMLT) in order to actually use that content when sending variable data print jobs to high-end printers. In many applications, a text-editor, such as notepad, may be used to create the PPML template. The editing process may require a number of iterations to result in the desired document.

Therefore, it can be seen that while PPML offers substantial advantages for variable data printing, currently available tools inadequately perform the task of generating PPML templates. Accordingly, an apparatus utilizing a faster method of PPML template generation would be useful.

SUMMARY

A system and method of operation is configured to produce a PPML (personalized print markup language) template from a PDF document. In one implementation, the system opens the PDF document and converts a PDF element within the PDF document into a variable object. A macro file is generated, which contains rules governing use of the variable object. The PPML template is configured to include the variable object, the macro file and the PDF document, wherein the PDF document is configured as a background within the PPML template.

BRIEF DESCRIPTION OF THE DRAWINGS

The following detailed description refers to the accompanying figures. In the figures, the left-most digit(s) of a reference number identifies the figure (FIG.) in which the reference number first appears. Moreover, the same reference numbers are used throughout the drawings to reference like features and components.

FIG. 3-11 are exemplary components of the user interface seen in FIG. 2.

FIG. 18 is a block diagram illustrating an exemplary PPML to PDF converter.

DETAILED DESCRIPTION

Figure 1:
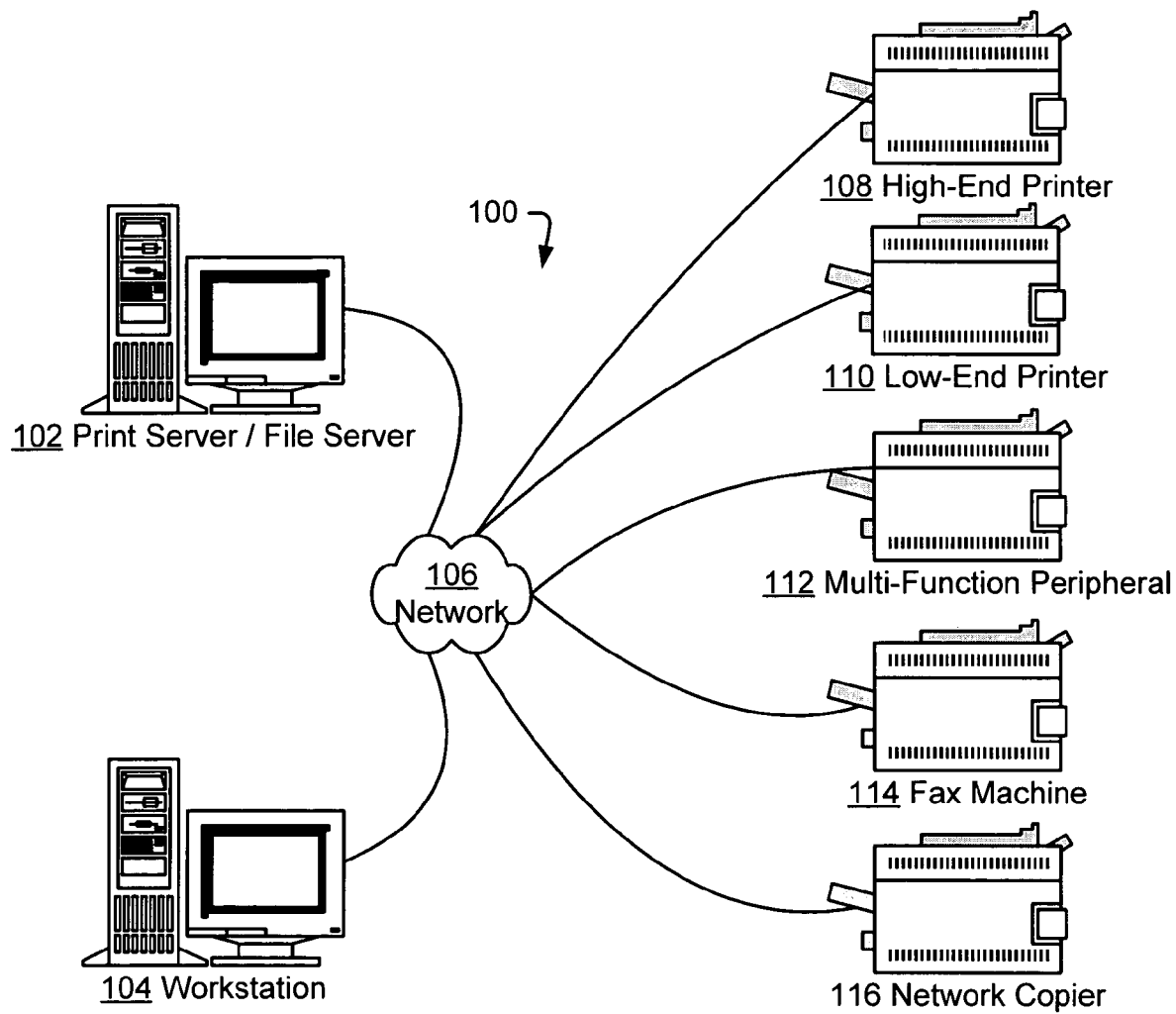
FIG. 1 is an illustration of an exemplary environment within which PDF document to PPML template translation may be performed.

A system and method of operation is configured to produce a PPML template from a PDF document. One implementation of the system is configured to allow a user to open the PDF document and to convert a PDF element within the PDF document into a variable object. For example, an image or a region of text within the PDF document may be selected by the user for transformation into a variable object for inclusion within the PPML template. A macro file—to contain rules governing use of the variable object—is either selected from among existing macros or custom-generated. Exemplary rules for variable objects which are images regulate issues such as image scaling or image cropping. Exemplary rules for variable objects which are text regulate issues such as font sizes and text-wrapping. Exemplary macro files may utilize an XML format and an XSLT (XSL template) schema. An exemplary PPML template may be configured to include one or more variable objects, the macro file optionally associated with each variable object (or a link to the macro file), and a version of the PDF document, wherein the PDF document may be configured as a background within the PPML template.

The ability to produce a PPML template from a PDF document is advantageous for authors who produce content using a wide variety of applications which output in PDF. The PDF output from any of the tools can be easily converted into a PPML template, which can then be merged with data to form a PPML print job which is sent to high-end digital presses. Thus, PDF to PPML template translation bridges the gap between commonly available PDF documents and high-end, PPML-consuming digital presses.

As will be seen in greater detail (e.g. FIG. 12), a graphic designer or other content-generating professional can create a PDF containing information, such as commercial advertising material. Advantageously, a non-expert user can then "mark" the PDF document, which is then converted into a PPML template. The marking and conversion may be performed by a user without any knowledge of the PDF structures contained within the PDF document. Accordingly, the user is able to convert the PDF document into a PPML template with little or no consideration of the complex layers, objects and other structures found within the PDF document. In producing the PPML template, the user may have indicated that portions of the PDF document, such as a product's image and price, are to be variables within the PPML template. Other portions of the PDF document form a background for the PPML template. Rules, configured as macros, are assigned by the user to govern operation of the variables. For example, the rules may govern text-wrapping and image-cropping. The rules may also govern communication with a database. For example, the rules may associate image and text variables with images of product packaging and pricing, respectively, for each of one or more corporate sales regions. Accordingly, data may be inserted into the variables according to the rules and sent to a high-end printer, such as a digital press.

FIG. 1 is an illustration of an exemplary environment 100 within which PDF document to PPML template translation may be performed. A print server or file server 102 is configured to receive a print job received from any of a plurality of workstations 104. In an exemplary application, a PDF document is translated into a PPML template on the workstation 104. Utilizing the PPML template, PPML print jobs may be sent over a network 106 to high-end printer 108. The exemplary environment 100 also illustrates a low-end printer 110 multifunctional peripheral 112, fax machine 114, network copier 116 or other printing or imaging device. Accordingly, in the exemplary environment, a high-end printer 108 (such as a digital press or an offset press) consumes PPML print jobs based on the PPML template created, while lower-end devices 110-116 may consume PDF, PostScript® and other print jobs.

Figure 2:
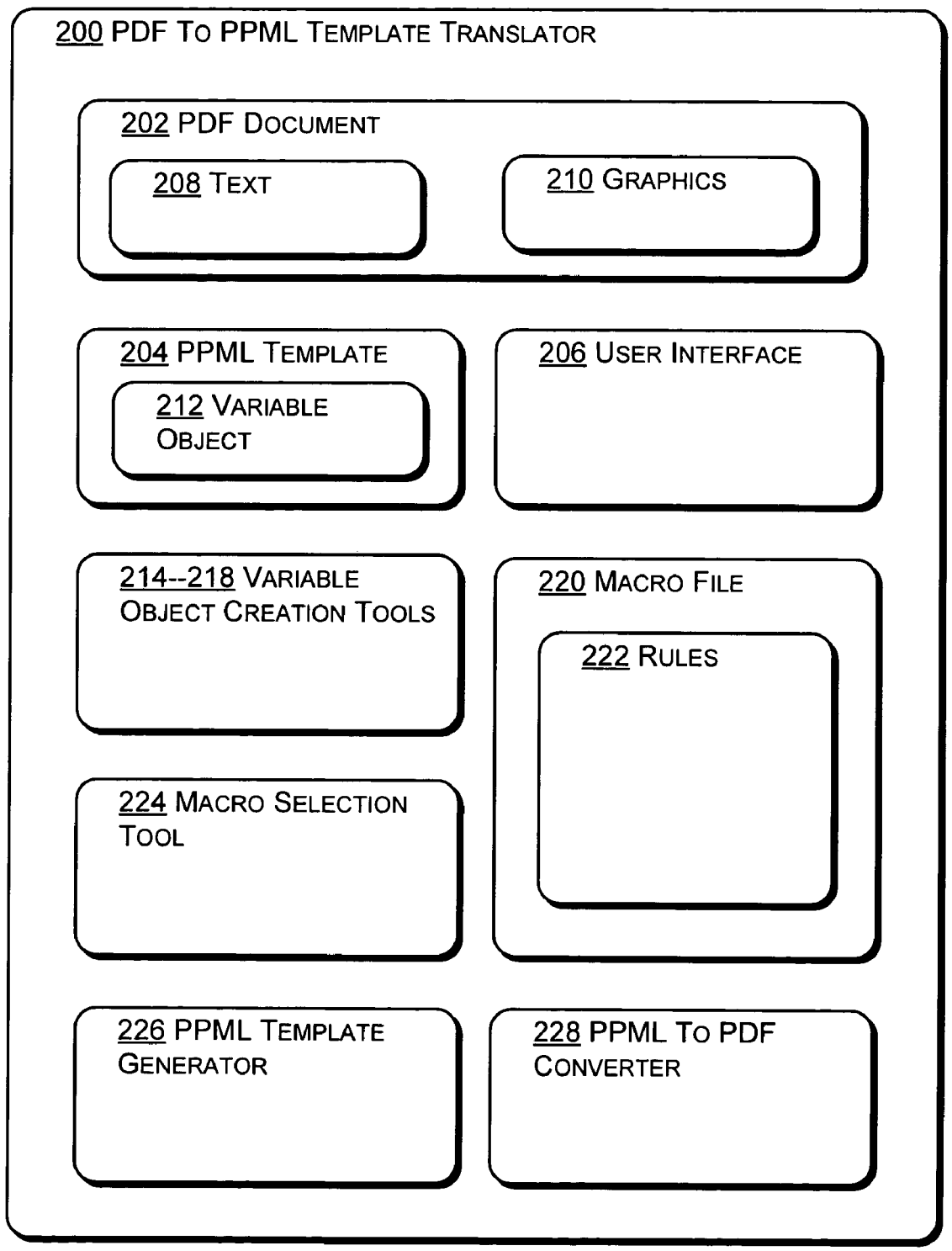
FIG. 2 is a block diagram illustrating an exemplary implementation of a PDF document to PPML template system.

FIG. 2 is a block diagram illustrating an exemplary implementation of a PDF document to PPML template translation system 200, which, in one implementation, may be configured as a plug-in for Adobe® Acrobat®. As will be seen in greater detail below, a PDF document 202 is translated into a PPML template 204. A user interface 206 allows the user to select PDF elements, such as with variable object creation tools 214-218, as will be seen in greater detail below. The tools 214-218 allow selection of regions of text 208 or graphics 210, within the PDF document 202, which may be converted into a variable object 212 for inclusion within the PPML template 204. Portions of an exemplary user interface 206 are seen in FIGS. 3-11. As will be seen in greater detail below, each variable object created may be associated with a macro file 220 which includes rules 222 governing the operation of the object. Exemplary rules address issues such as text-wrapping or image-cropping. Macros are selected using a selection tool 224, which may incorporate dialog boxes, such as those seen in FIG. 8. The macros 220 may be pre-defined or custom made.

A PPML template generator 226 is configured to assembly a PPML file 204 to (typically) include at least one variable object 212, at least one macro file 220 or link to such a file, and the PDF document 202. In many implementations, a portion or version of the PDF document is configured as a background object within the PPML template 204.

The structure of the PPML template 204 may be saved as an optimized tree-structure. Where a PPML to PDF converter 228 is available, an optimized PDF file results as a means to preview the use of the generated PPML template in further parts of the workflow. In such an optimized PDF file, multiple instances of a PDF component will be substituted for by references to the PDF component, thereby increasing efficiency. An exemplary PPML to PDF converter 228 is seen in FIG. 18.

FIG. 3 shows a portion of an exemplary user interface 206 (FIG. 2) for a PDF document to PPML template translation system 200, which may be configured as a plug-in for Adobe® Acrobat®. The user interface for the plug-in seen in FIG. 3 allows a user to translate a PDF document 202 into a PPML template 204 by transforming PDF objects (image or text) to variable objects. Variable objects 212 (FIG. 2) have the characteristic that the image or text contained therein can be changed, thereby allowing for each print job to be personalized. The plug-in adds three tools 214-218 (seen separately in FIG. 4). A first tool 214 is labeled [I/R] (seen in FIGS. 2 and 4) and is configured to allow the user to select portions of a template, and to thereby create a variable object 212 configured for graphical images. Similarly, a second tool 216 is labeled [T/R] (seen in FIGS. 2 and 4) and is configured to allow the user to select portions of a template, and to thereby create a variable object 212 configured for text. Additionally, a third tool 218 is labeled [/R] (seen in FIGS. 2 and 4) and is configured to allow the user to select portions of a PDF object, and to thereby create a new variable object 212 configured as a generic variable. As seen in FIG. 3, there is a menu entry 302 labeled "PPML" in the Acrobat® menu, having operation that will be discussed in association with FIG. 6.

FIG. 5 shows three successive views 502-506 illustrating the creation of a template object. Initially, a PDF file is opened. A page of such a file is represented by the page 502 on the left side of FIG. 5. The image tool 214 or text tool 216 is selected, as required. The cursor changes according to the tool selected, allowing the user to draw a rectangle 508 on the template, as seen in the left side of FIG. 5. An image or text dialog box, e.g. FIGS. 10 or 9 respectively, appears. The user fills in the fields of the dialog box (e.g. FIG. 9 or 10), as discussed below. Similarly, a PDF object may be transformed into a new variable object. A PDF document 202 is opened and the third tool 218 of FIG. 4, discussed above, is selected. The cursor changes appropriately. The user is allowed to select a PDF object: path, image, Xobject or text. Using the PPML menu 302, the user selects PPML\Transform to Variable Object. The image or text dialog box of FIGS. 10 or 9 appears (as discussed below) and the user fills out the available fields. In general, the system 200 is configured to provide dialog boxes after creation of a new object. A user can enter information such as alignment of the object within the PPML template 204, and importantly, macros that can be used with the object. The macros may be XSLT rules that can be imported into the plug-in 200 from external XML files. The XSLT rules govern the behavior of the text and/or images. For example, text wrapping and justification, as well as image cropping or re-sizing are governed by such rules.

The second image 504 in FIG. 5 illustrates a graphical image that is pasted into the location defined by the user in the first image 502 of FIG. 5. The third image 506 in FIG. 5 illustrates the ability of the user to resize and move images, once added to the template. Conventional tools may be used for these purposes. The user can move, resize or delete objects using an appropriate cursor. The user can additionally select an object and edit it by using the PPML menu 302. The object tools 214-218 seen in FIG. 4 may be configured so that when a user handles the object tool and selects an object, the selection rectangle 502 (FIG. 5) is colored red to indicate selection of a PDF object, and is colored blue to indicate selection of a variable object.

Figure 6:
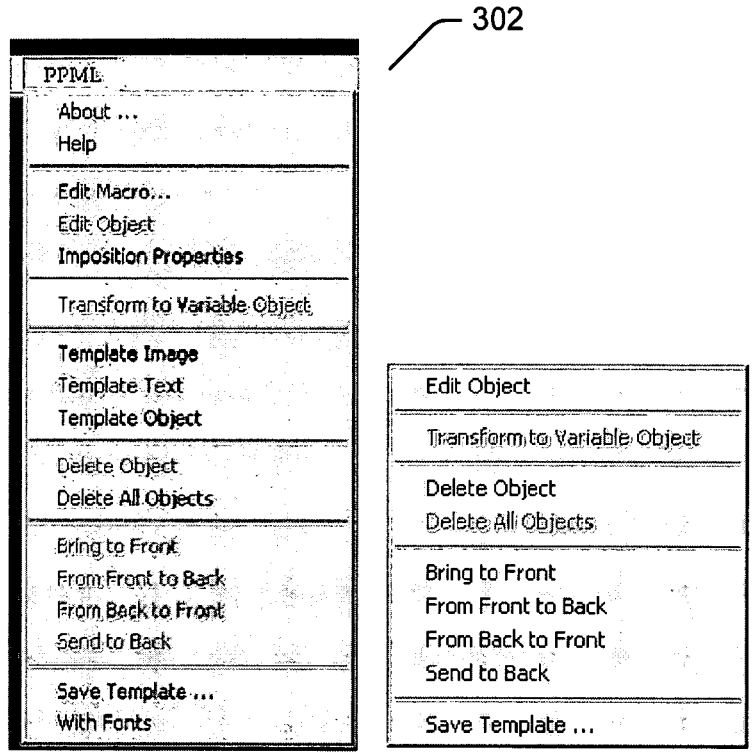

FIG. 6 shows menu items 302 associated with the functionality of the plug-in 200. The plug-in 200 is configured to include support for several documentation menu selections. The "About . . . " selection is configured to give the current version number of the plug-in 200. The "Help" selection is configured to open an associated help document.

Continuing to refer to FIG. 6, the plug-in 200 is configured to include support for several editing menu selections. The "Edit Macro . . . " selection is configured to open the macro dialog box (see the discussion of FIG. 8, below), which allows updating of macro templates. Additionally, the user can load a file containing certain previously-written macro templates. The "Edit Object" selection is configured to open Image or Text Dialog Box to allow the user to edit the selected object. The "Imposition Properties" selection opens the Imposition Dialog Box to change the current imposition properties (see additional discussion related to FIG. 11, below).

Continuing to refer to FIG. 6, the plug-in 200 is configured to include support for a transformation menu selection. The selection "Transform to Variable Object" selection is configured to transform the selected PDF object (e.g. a text or graphical element within a PDF file) into a variable object 212.

Continuing to refer to FIG. 6, the plug-in 200 is configured to include support for several manipulation menu selections. A "template image" selection selects the image template tool 214 (FIGS. 2-4). A "template text" selection selects the text template tool 216 (FIGS. 2-4). A "template object" selection selects the object template tool 218 (FIGS. 2-4).

Figure 7:
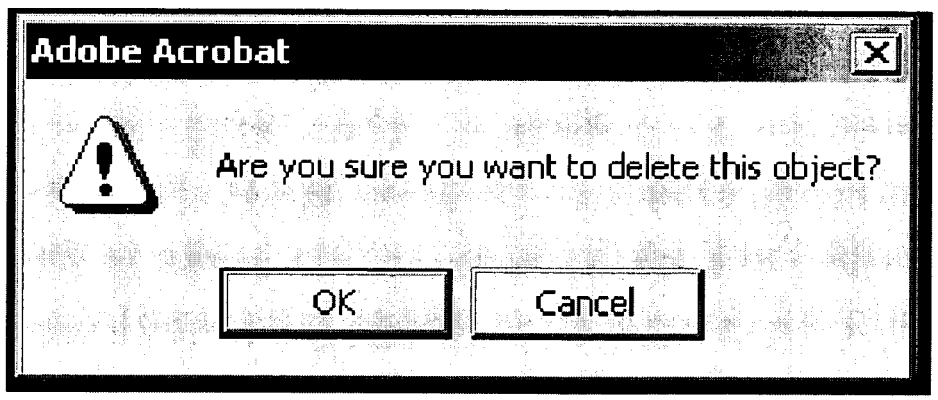

Continuing to refer to FIG. 6, the plug-in 200 is configured to include support for several deletion menu selections. A "Delete Object" selection deletes the selected object. The message seen in FIG. 7 is typically displayed prior to actually deleting the object. Similarly, the "Delete All Objects" selection deletes all objects, and displays a message similar to FIG. 7 before doing so.

Continuing to refer to FIG. 6, the plug-in 200 is configured to include support for several image selections which arrange images according to foreground and background. A "Bring to Front" selection moves the selected image to the front. A "From Front to Back" selection moves the selected image from front to back. A "From Back to Front" selection moves the selected image from back to front. A "Send to Back" selection moves the selected image to the back. In using the manipulation selections, the user moves the selected image from current position (in the z-order axis) to front or back. Each selection of the menu moves the selected image one position, either toward the front or back, according to the selection.

Continuing to refer to FIG. 6, the plug-in 200 is configured to include support for several save selections for saving the document in a PPML template format. A "Save Template . . . " selection is configured to save the current document to a PPML template. A "With Fonts" selection is configured to save the properties of all the fonts used in the text templates in a file named "filename.fonts.txt," or similar.

Figure 8:
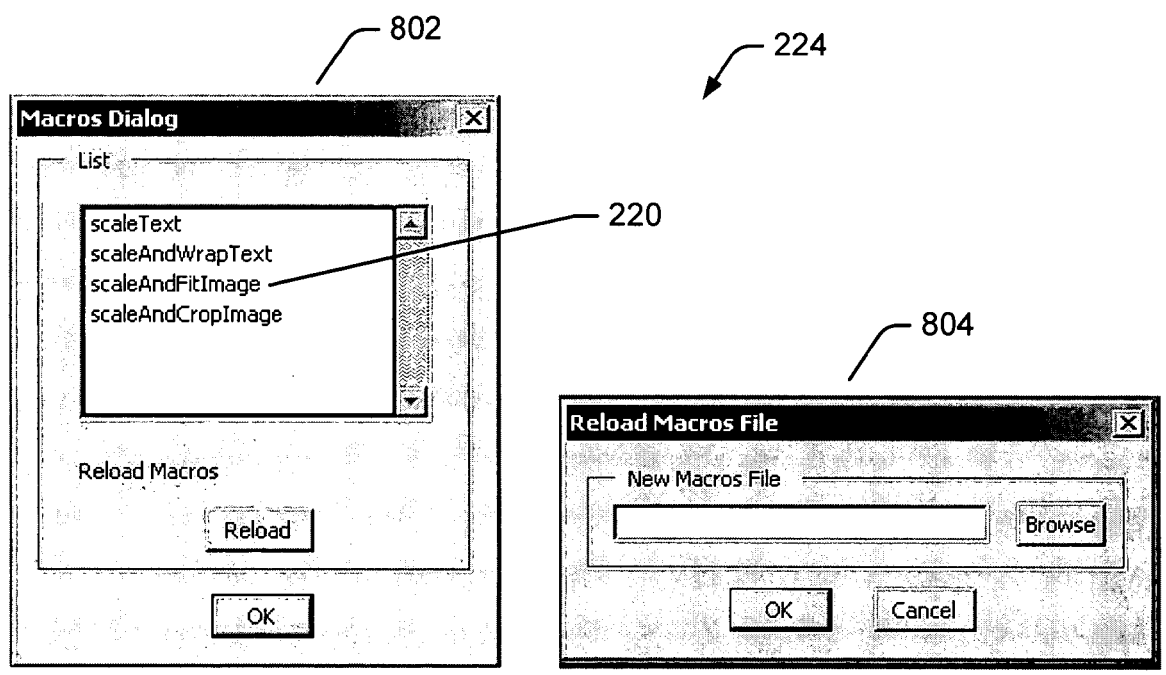

FIG. 8 shows an exemplary macro selection tool 224, in this example configured as dialog boxes which the plug-in 200 is configured support. In particular, macro dialog boxes allow the user to configure and manage macros 220, which govern the rules by which variable objects within the PPML template are managed. At dialog box 802, macros 220, which have been predefined, may be selected for attachment to a variable object 212 (FIG. 2). At dialog box 804, a user may load or attach a macro 220, which has been custom-designed, to a variable object.

In an exemplary implementation, macros 220 are contained in an XML file defined by an XSL schema. The first template tag is named 'index' and describes the entire macro. Exemplary code is seen below.

```
<xsl:template name="index">
    <function name="scaleText" type="text"/>
    <function name="scaleAndWrapText" type="text"/>
    <function name="scaleAndFitImage" type="image"/>
    <function name="scaleAndCropImage" type="image"/>
</xsl:template>
```

Name and type values are typically mandatory for each macro template. Additionally, macros may have parameters; for example, a macro supporting an image variable may have parameters including: image name, image width, image height, mark width, and mark height. Similarly, a macro supporting a text variable may have parameters including: font information (e.g. font size, line height, number of characters per line, letter-spacing, baseline offset), text to be outputted, source width and height, font family, font color, horizontal alignment and baseline alignment.

Figure 9:
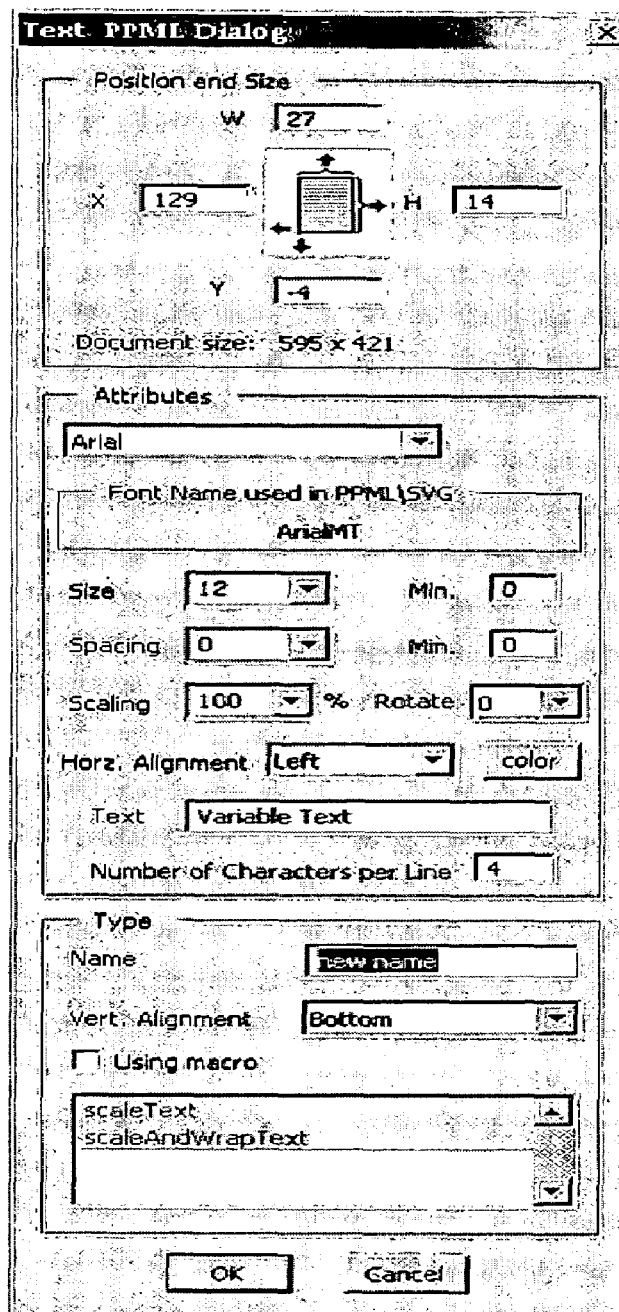

FIG. 9 shows an additional exemplary dialog box which the plug-in 200 is configured to support. In particular, text dialog box 900 allows the user to input position and size parameters according to the following variables: X, the abscissa in the relative media box system; Y, the ordinate in the relative media box system; W, the rectangle width; and H, the rectangle height. The exemplary text dialog box shown additionally allows the user to input attributes such as the following variables: font name, e.g. the full font name; font named, used in PPML\SVG (scalable vector graphics) or in the PPML template; size, the text size; "min.", the minimal text size; spacing, the text scaling; "min." the minimal text spacing; scaling, the text scaling width; rotate, the orientation of the text, expressed as either 0, 90 or 270 degrees; horizontal alignment, expressed as left, center, right or justified; color, selection is made by the user using a text color dialog; text, the visible text in the PDF file, by default the 'Variable Text'; and number of characters per line, the maximal text length in the rectangle. Note that SVG (Scalable Vector Graphics) is an XML-based language for describing device-independent two-dimensional graphics, text and graphical applications in XML. It is exemplary of many possible formats within which content may be expressed inside PPML templates. Within a PPML template written in XML, use of SVG may provide performance advantages when SVG is used to represent text that will be sent to a digital press. Additionally, SVG aligns well with use of XSLT inside PPML template, and is compatible with the use of macros. Accordingly, SVG is one of the formats with which variable objects can be represented within the PPML template.

The exemplary text dialog box 900 is additionally configured to allow the user to enter type parameters, which include the following variables: name, the private name of the object using the PPML template; vert. alignment, the vertical alignment, i.e. top, middle or bottom; using macro, if the use has associated a macro with this object; and macro name, the name of the selected macro.

Figure 10:
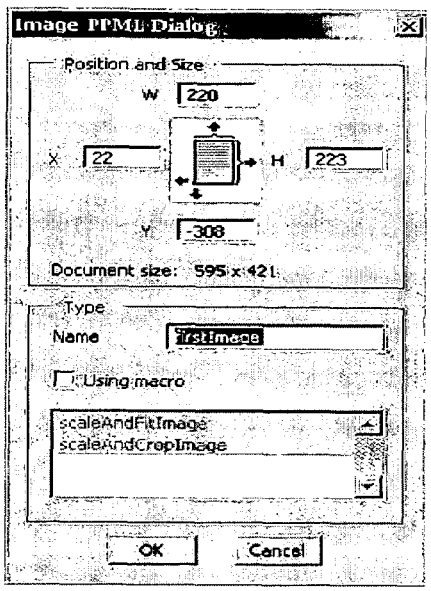

FIG. 10 shows an additional exemplary dialog box 1000 which the plug-in 200 is configured support. In particular, the image dialog box 1000 allows the user to locate an image within the template. The position and size parameters show the following variables: X, the abscissa in the relative media box system; Y, the ordinate in the relative media box system; W, the width of the rectangle; and H, the height of the rectangle. Additionally, the image dialog box 1000 allows the user to express type parameters according to the following variables: name, the private name of the object using the PPML template; vertical alignment, expressed as top, middle or bottom; using macro, if the user has associated a macro with the object; and macro name, if there is a macro. Note that the parameters X, Y, W and H allow the user to control with greater accuracy the original parameter values, which reflected the operation of the selection tool 214. In an alternative, a "scaleAndFitImage" option could allow the user to cause the image to be scaled and centered with an area. Also, note that where the size allotted for the image is insufficient, macros will provide rules governing a decision to scale or crop the image. And still further, note that the private name is the name given to this image object (which is analogous to a similar situation with text objects) when the image object becomes variable, and is the name by which the object is referenced as a variable. Therefore further references to the object will be done through that name. The macro name relates to a specific macro that is imported into the system in response to use of the named variable object in the template.

Figure 11:
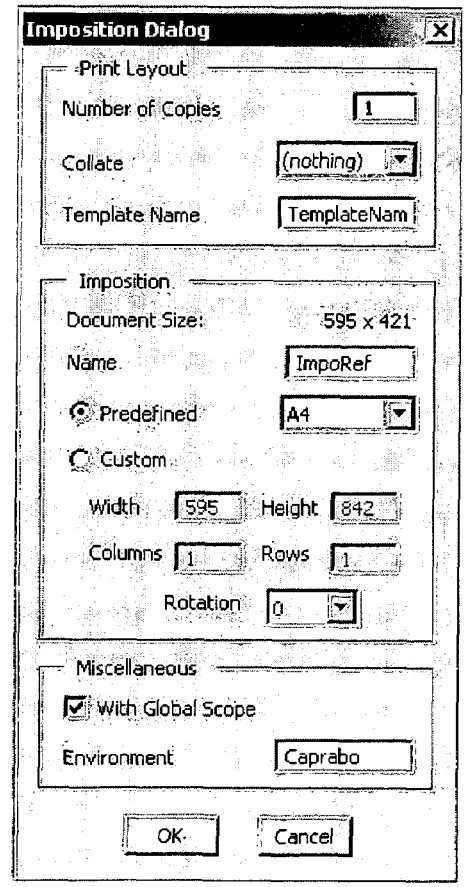

FIG. 11 shows an additional exemplary dialog box 1100 which the plug-in 200 is configured support. In particular, the dialog box 1100, showing imposition properties for the template, provides an interface with which the user may input parameters that are used in the calculation of the imposition. The imposition defines how logical pages will be mapped into physical pages. For example the user may want to repeat a single page n-times, or to make each logical page half its original size so that, when rotated to the left, two logical pages can be placed into a physical page for performing custom booklet printing. A print layout parameters section shows the following variables: number of copies, for this imposition; the need to collate; the copy order; the template name; and the private template name.

An impositions parameters section shows the following variables: document size, the current size of the PDF document; name, the private impositions name; and predefined, the predefined imposition, such as a building imposition wherein two A4 pages are printed as one A3 page or wherein two A6 pages are printed as one A4 page.

A custom parameter section allows the user to choose imposition values, including: width, the paper sheet width; height, the paper sheet height; columns, the number of columns; rows, the number of rows; and angle, rotation angle, typically defined as 0, 90 or 270 degrees.

A miscellaneous parameters section allows the user to choose the following variables: with global scope, allows the user to select (i.e. yes or no); and environment, allows the user to name the private environment name.

Figure 12:
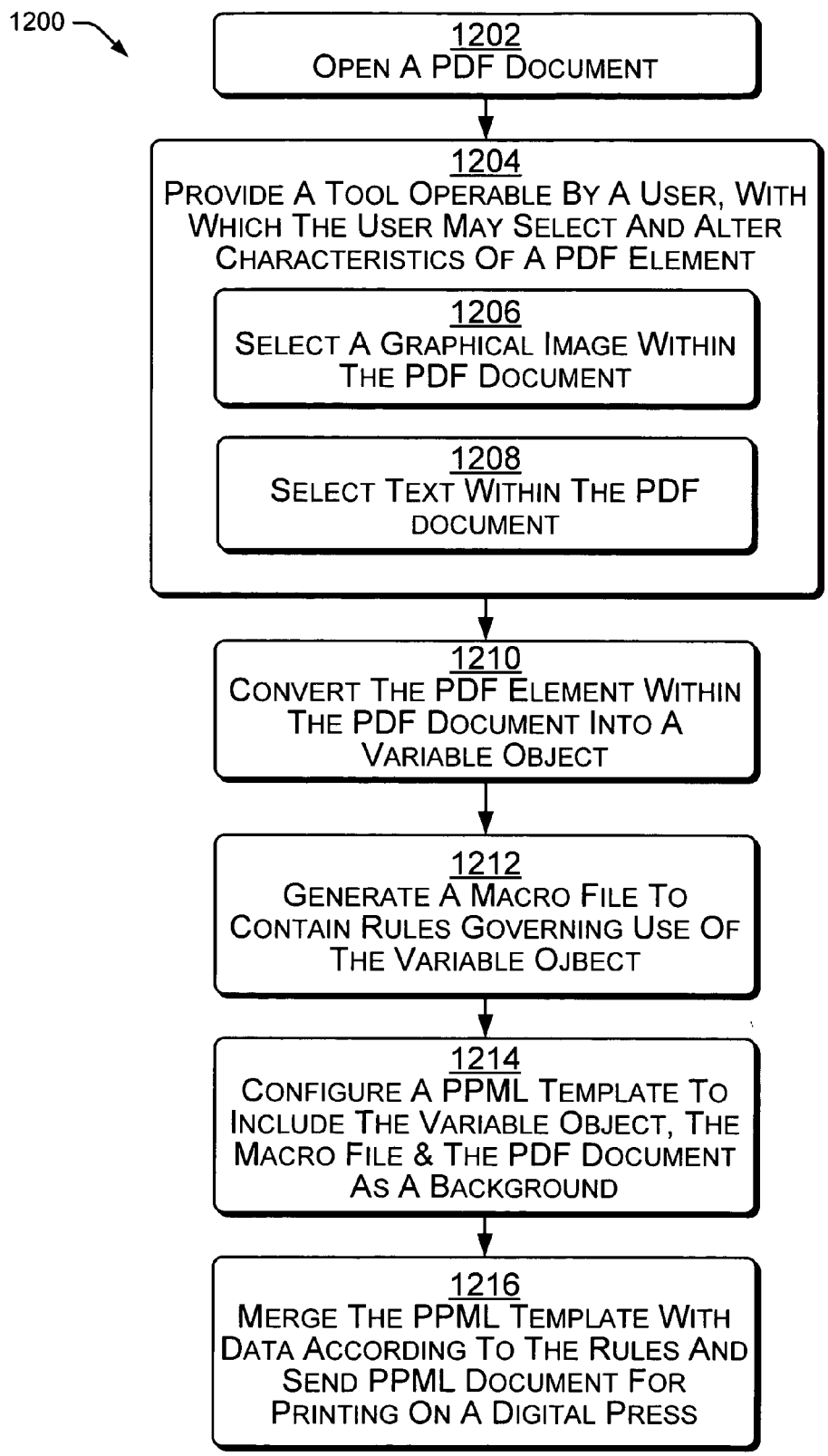
FIG. 12 is a flow diagram that describes exemplary PDF document to PPML template translation.

FIG. 12 is a flow diagram that describes exemplary PDF to PPML template translation 1200. In particular, a PPML template 204 (FIG. 2) is created using a PDF document 202, wherein elements within the PDF document 202 are converted into variable objects 212, macros 220 are generated to contain rules governing use of the variable objects 212, and a PPML template 204 is configured to include the variable object 212, the macro file 220 and the PDF document 202, wherein a version of, or portions of, the PDF document 202 is configured as a background within the PPML template 204.

At block 1202, a PDF document is opened. At block 1204, a tool is provided to a user, with which the user may select and alter characteristics of a PDF element. This may be performed in a number of ways, two of which are listed here, and others of which are seen within other locations of this specification. In a first alternative, at block 1206, the user is selects a graphical image within the PDF document 202. The graphical image may be selected with a tool such as image selection tool 214. In a second alternative, seen at block 1208, the user selects text within the PDF document. The text may be selected with a tool such as text selection tool 216.

At block 1210, the element within the PDF file which was selected may be converted into a variable object 212 (FIG. 2). For example, a "tagged" image region is configured so that images within the region may be substituted; similarly, a text region may be tagged to allow alternate text to be substituted. In one example, the transformation to a variable object may be performed in response to selection of the "Transform to Variable Object" selection of the menu of FIG. 6.

At block 1212, a macro file is generated or obtained to contain rules governing use and reuse of the variable object. The macro file may be obtained using a macro selection tool 224 (FIG. 2) from existing predefined macros or from alternate or custom macros. Dialogs 802 and 804 (FIG. 8) illustrate exemplary implementations of the macro selection tool 224 which allows selection of a macro which will govern characteristics (such as text-wrapping and image-cropping) within the variable object 212 (FIG. 2).

At block 1214, the PPML template 204 is configured to include the variable object 212 or a definition of the variable object, the macro file 220 (or links to the macro file) and a version of the PDF document configured as a background. The PPML template 204 may be configured in this manner using code such as the PPML template generator 226 (FIG. 2).

At block 1216, the PPML template is merged with data according to rules 222 defined by a macro file 220 (FIG. 2). Where the data is merged with the PPML template, a PPML document is created. Such a document may be printed by a high-end printer, such as a digital press.

Figure 13:
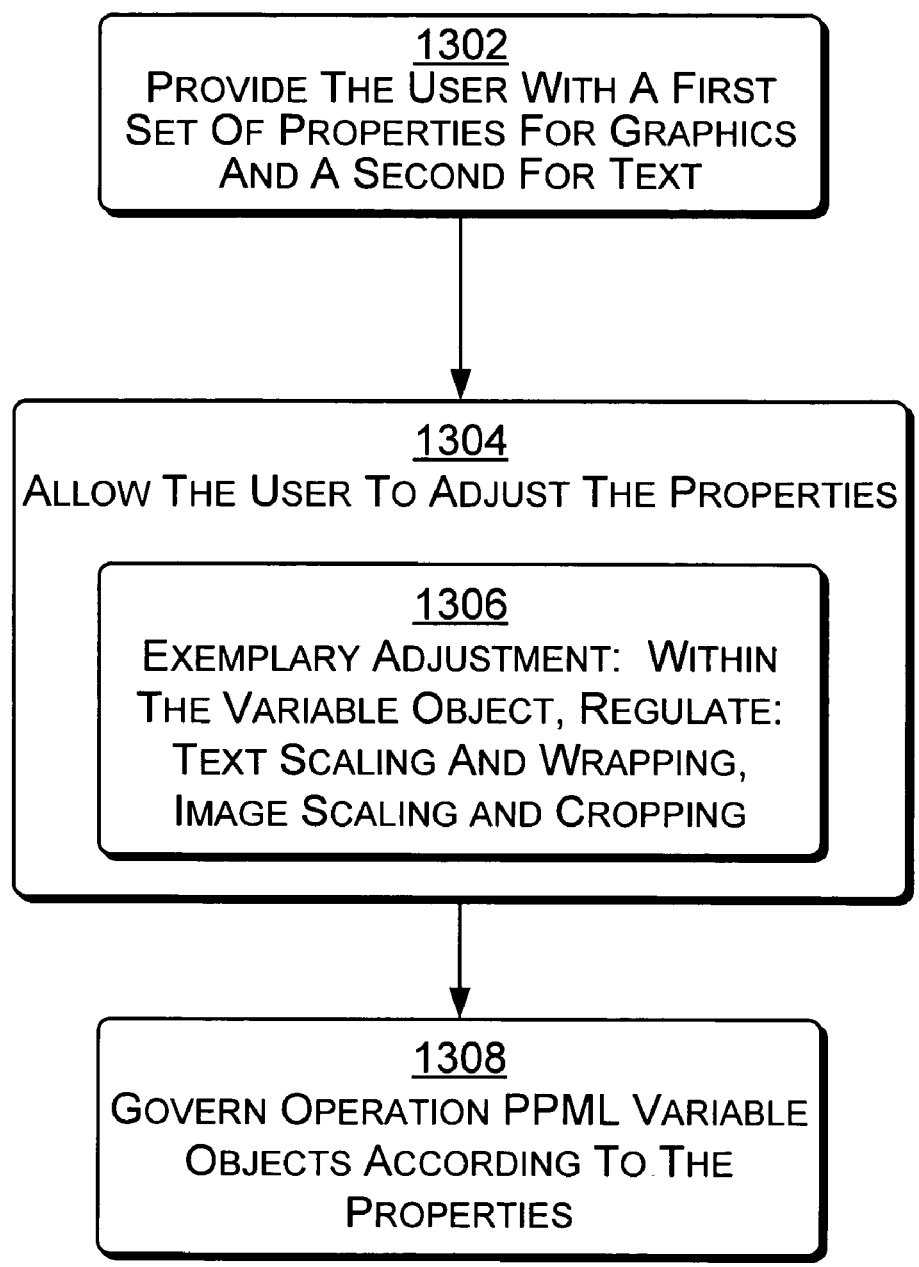
FIG. 13 is a flow diagram that describes exemplary generation and application of rules to variable objects formed from PDF elements.

FIG. 13 is a flow diagram 1300 that describes exemplary generation and application of rules to variable objects formed from PDF elements. Each variable object may be associated with rules governing the operation of the variable object. At block 1302, the user is provided with a first set of properties for association with variable image objects and a second set of properties for association with variable text objects. For example, the FIG. 9 provides an exemplary interface that expresses text properties, while FIG. 10 provides an exemplary interface that expresses graphical image properties. At block 1304, the user is allowed to adjust the properties. Exemplary adjustments the user is allowed to make are seen in FIGS. 9-10. For example, at block 1306, the user is able to adjust text scale and text wrap in the interface of FIG. 9, and is able to adjust image scale and image cropping in the interface of FIG. 10. At block 1308, the conversion of the PDF element to a variable object within the PPML template, and the operation of the variable object within the PPML template, is governed by the properties selected. The properties may be saved as rules 222 within the macro file 220. Thus, during operation of the variable objects 212, the rules 222 within the macro 220 are consulted. For example, the decision to either compress or crop an image to fit a location would be governed by rules 222 within a macro 220 which are associated with a variable object 212 within the PPML template 204.

Figure 14:
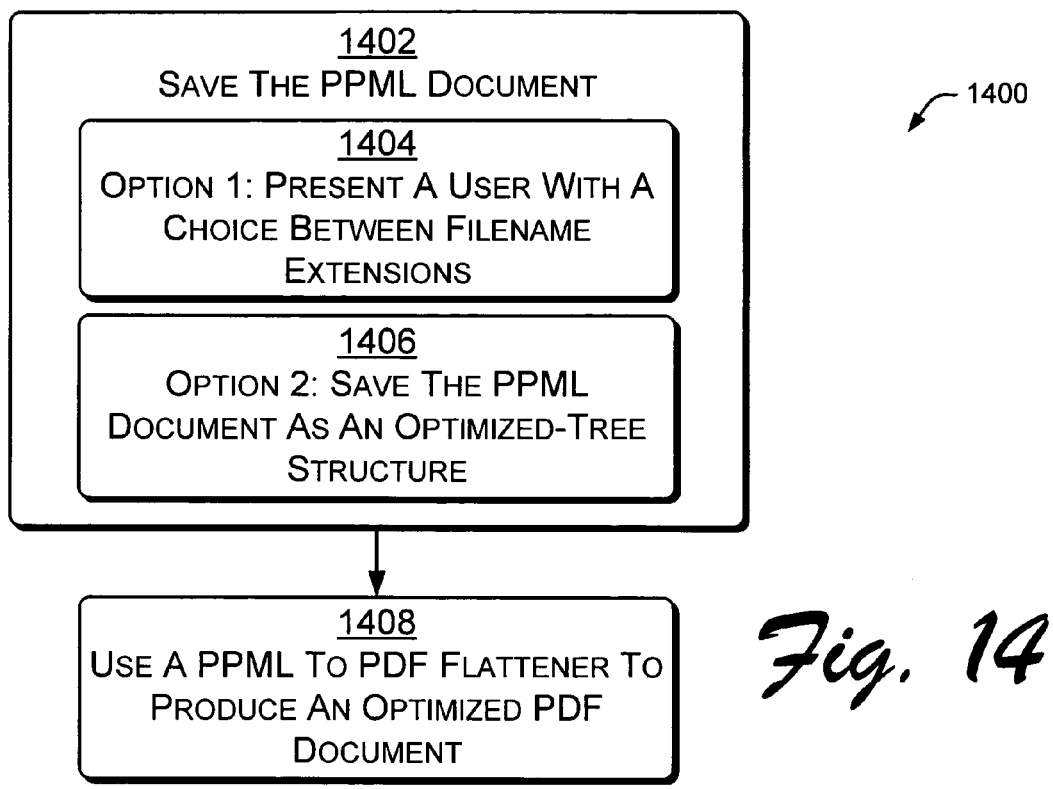
FIG. 14 is a flow diagram that describes exemplary saving of the PPML document.

FIG. 14 is a flow diagram 1400 that describes exemplary saving of the PPML document. At block 1402, the user instructs the PDF document to PPML template translator 200 to save the PPML template 204 (FIG. 2). This may be performed in a number of ways, two of which are listed here, and others of which are seen within other locations of this specification. In a first option, at block 1404, the user is presented with a choice between filename extensions. For example, the user may be allowed to select between .ppml and .ppmlt extensions. Note that saving as a PPML document having a .ppmlt extension (i.e. saving as a template) is typically performed. When saving as a PPML document having a .ppml extension, the XSLT rules 222 are not included in the saved document, and some variation in syntax of the save file may result. In a second option, at block 1406, the PPML template 204 (FIG. 2) is saved as an optimized-tree structure. At block 1408, the PPML to PDF converter 228 (FIGS. 2 and 18) may be used to produce a PDF document from the PPML document. In some cases, an optimized PDF document will be produced; such as, for example, when for reasons of economy a single converter is employed in the system. In other cases, such as where the PDF document will be viewed once as a preview and then discarded, the PDF document may not be optimized, but instead may be configured for rapid generation by a simpler, non-optimized converter. In the optimized PDF document, subsequent instances of a PDF object will be substituted with references to an initial instance of the PDF object. Accordingly, the PDF may be printed more efficiently, due to the substitution. An exemplary PPML to PDF converter is seen at 228 in FIG. 2, and is disclosed in much greater detail in FIG. 18 and associated discussion.

Figure 15:
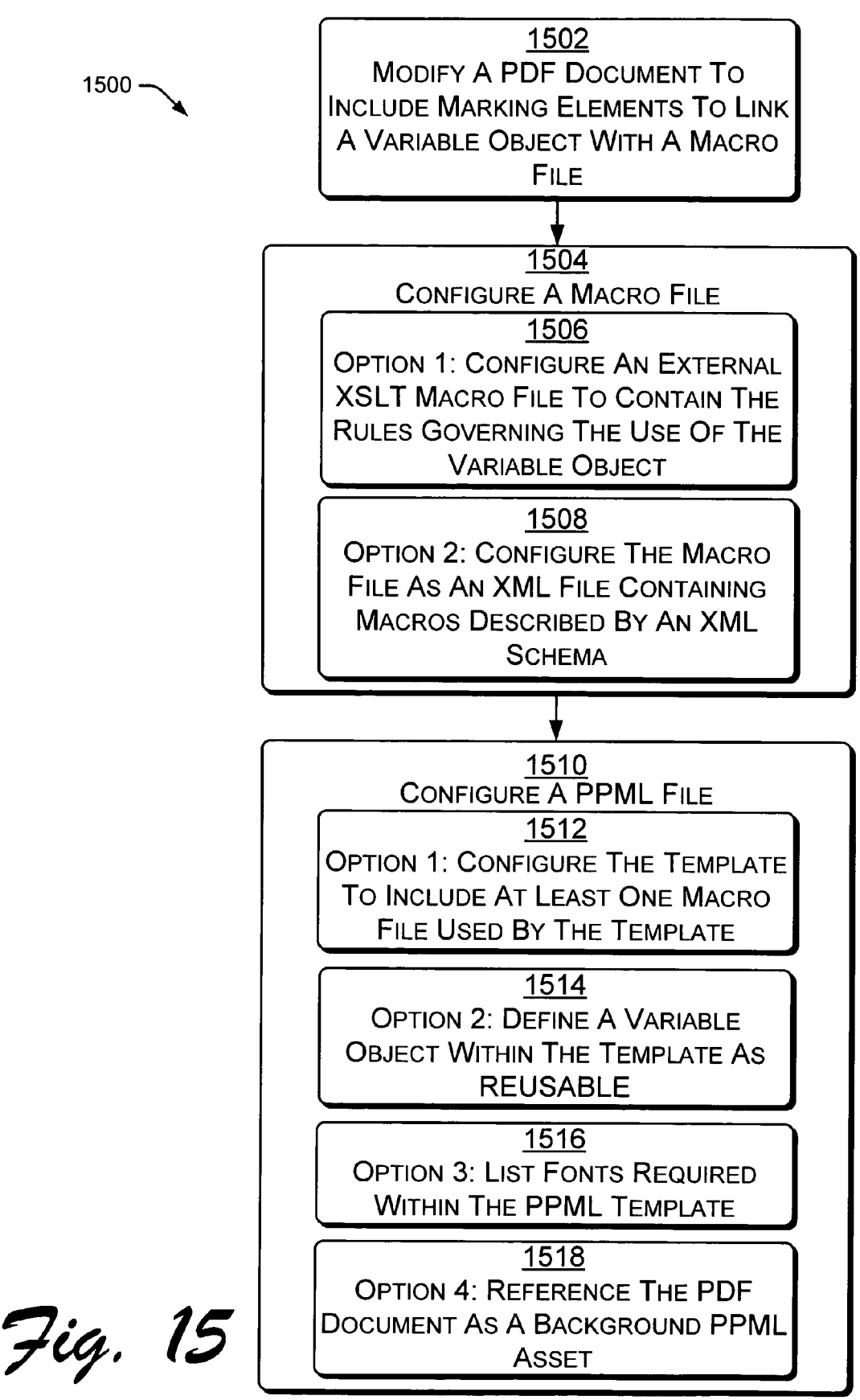
FIG. 15 is a flow diagram that describes exemplary configuration of the PPML template.

FIG. 15 is a flow diagram 1500 that describes exemplary configuration of a PPML template. At block 1502, the PDF document is modified to include marking elements to link a variable object with a macro file. For example, as seen in FIG. 2, the variable object 212 may be marked to link it to a macro file 220. At block 1504, the macro file is configured. As seen above, the macro file may be configured by the user using a macro selection tool 224, such as the examples illustrated in FIGS. 9 and 10. Macro file configuration may be performed in a number of ways, two of which are listed here, and others of which are seen within other locations of this specification. In a first option, at block 1506, an external XSLT macro file is configured to contain the rules governing the use of the variable object. The XSLT file may be previously written for the user, so that the user does not have to know XSLT programming. Instead, the user simply selects the file, such as by an interface seen at FIG. 8. In a second option, at block 1508, the macro file is configured as an XML file containing macros described by an XML schema.

At block 1510, the PPML file 204 is configured. In the example of FIG. 2, the PPML template is produced by the PPML template generator procedure 226; however, the characteristics of the program which configures the PPML template 204 may be varied to suit a desired application. In one option, at block 1512, the PPML document is configured as a template, typically including at least one macro file used by the template. At block 1514, in a second option, a variable object within the template may be defined as "REUSEABLE". At block 1516, in a third option, fonts required by the template may be listed. At block 1518, the PDF document may be referenced as a background PPML asset.

Figure 16:
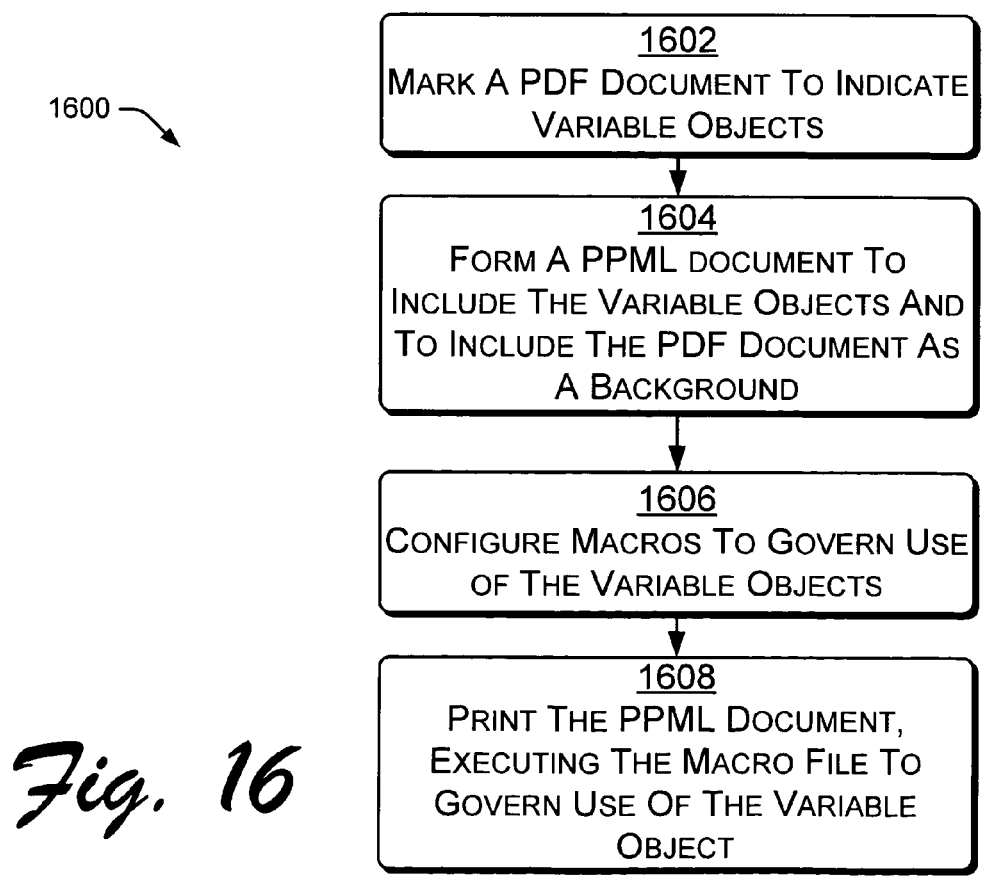
FIG. 16 is a flow diagram that describes exemplary creation and use of a PPML template.

FIG. 16 is a flow diagram 1600 that describes exemplary creation and use of a PPML document. At block 1602, a PDF document (or a copy of the PDF document) is marked to indicate variable objects. The marking can be made by tools 214-218 (FIG. 2), and seen in greater detail in FIG. 4. At block 1604, a PPML template is formed to include the variable objects and to include the PDF document as a background. At block 1606, macros to govern use of the variable objects are configured and included, or referenced by, the PPML template. At block 1608, a PPML document based on the PPML template is printed. During the printing process, macros are executed to govern use of the variable objects contained within the PPML document.

An exemplary PPML template is seen below.

```
<!-- Background -->
<REUSABLE_OBJECT>
    <OBJECT Position="0 0"> <!-- "xx yy" -->
    <SOURCE Format="application/pdf" Dimensions="ww hh">
        <EXTERNAL_DATA
Src="{$record/F[number($recordMapper/FIELD[@Name='Background']/@Position)]}"/>
    </SOURCE>
    </OBJECT>
    <OCCURRENCE_LIST>
        <OCCURRENCE
Name="{$record/F[number($recordMapper/FIELD[@Name='Background']/@Position)]}" Environment="GroceryStore" Scope="Global">
            <VIEW>
                <TRANSFORM>
                    <xsl:attribute name="Matrix">
                        <xsl:variable name="m1" select="1"/>
                        <xsl:variable name="m2" select="0"/>
                        <xsl:variable name="m3" select="0"/>
                        <xsl:variable name="m4" select="1"/>
                        <xsl:variable name="m5" select="0"/>
                        <xsl:variable name="m6" select="0"/>
                        <xsl:value-of select="concat($m1, ' ', $m2, ' ', $m3, ' ', $m4, ' ', $m5, ' ', $m6)"/>
                    </xsl:attribute>
                </TRANSFORM>
            </VIEW>
        </OCCURRENCE>
    </OCCURRENCE_LIST>
</REUSABLE_OBJECT>
<MARK Position="0 0">
    <OCCURRENCE_REF
Ref="{$record/F[number($recordMapper/FIELD[@Name='Background']/@Position)]}" Environment="GroceryStore" Scope="Global"/>
</MARK>
```

Remark:

by default, Scope="Global" and Environment="GroceryStore"

for image:

```
<xsl:if test = "not ($record/F[number($recordMapper/FIELD[@Name =
'ImageName']/@Position)] = '')">
  </xsl:if>
```

3. Variable Objects without Macro

.text:

```
<!-- Product Text: TextName -->
<MARK Position="xx yy">
  <OBJECT Position="0 0">
    <SOURCE Format="image/svg-xml">
      <xsl:attribute name="Dimensions">
        <xsl:variable name="width" select="ww"/>
        <xsl:variable name="height" select="hh"/>
        <xsl:value-of select="concat($width, ' ', $height)"/>
      </xsl:attribute>
      <INTERNAL_DATA>
        <SVG viewBox="0 0 ww hh">
          <text rotate="0" x="0pt" y="78.5pt" font-family="PostScipt Font Name" font-size="22pt" letter-spacing="0pt" text-anchor="start" alignment-baseline="bottom" fill="rgb(0,0,0)">
            <xsl:value-of select="$record/F[number($recordMapper/FIELD[@Name='TextName']/@Position)]"/>
          </text>
        </SVG>
      </INTERNAL_DATA>
    </SOURCE>
  </OBJECT>
  <VIEW>
    <TRANSFORM Matrix="1 0 1 0 0 0"/>
  </VIEW>
</MARK>
```
. image
```
<!-- Product Image: ImageName -->
<REUSABLE_OBJECT>
  <OBJECT Position="0 0">
    <SOURCE Format="image/jpeg" Dimensions="ww hh">
      <EXTERNAL_DATA Src="Image.jpg"/>
    </SOURCE>
    <VIEW>
      <TRANSFORM Matrix="1 0 0 0.1 0 0"/>
    </VIEW>
  </OBJECT>
  <OCCURRENCE_LIST>
    <OCCURRENCE Name="{$record/F[number($recordMapper/FIELD[@Name='ImageName']/@Position)]}" Environment="GroceryStore" Scope="Global">
      <VIEW>
        <TRANSFORM Matrix="1 0 0 1 0 0"/>
      </VIEW>
    </OCCURRENCE>
  </OCCURRENCE_LIST>
</REUSABLE_OBJECT>
<MARK Position="xx yy">
  <OCCURRENCE_REF Ref="{$record/F[number($recordMapper/FIELD[@Name='ImageName']/@Position)]}" Environment="GroceryStore" Scope="Global"/>
</MARK>
```

4. Variable Objects with Macro
.text

```
<!-- Product: TextName -->
<MARK Position="xx yy">
    <xsl:call-template name="TemplateName">
        <!-- font size, line height, number of character per line, letter-spacing, baseline offset -->
        <xsl:with-param name="fontInfo" select="'6 7.2 63 0 1.4 5 6.5 69 0 1.3 4 5.8 78 0 1.1 3 4.3 104 0 0.8 2 2.9 157 0 0.6 1 2.2 209 0 0.4'"/>
        <!-- Text to be outputted -->
        <xsl:with-param name="text" select="$record/F[number($recordMapper/FIELD[@Name='TextName']/@Position)]"/>
        <!-- Source width -->
        <xsl:with-param name="width" select="ww"/>
        <!-- Source height -->
        <xsl:with-param name="height" select="hh"/>
        <!-- Font family -->
        <xsl:with-param name="fontFamily" select="PostScript Font Name"/>
        <!-- Font color-->
        <xsl:with-param name="fontColor" select="'rgb(0,0,0)'"/>
        <!-- Horizontal alignment -->
        <xsl:with-param name="hAlign" select="'right'"/>
        <!-- Alignment baseline -->
        <xsl:with-param name="alignBaseline" select="'middle'"/>
    </xsl:call-template>
    <VIEW>
        <TRANSFORM Matrix="1.000000 0.000000 0.000000 1.000000 0 0"/>
    </VIEW>
</MARK>
```

. image

```
<!-- Product: ImageName -->
<REUSABLE_OBJECT>
    <xsl:call-template name="TemplateName">
        <!-- Image name -->
        <xsl:with-param name="image" select="$record/F[number($recordMapper/FIELD[@Name='ImageName']/@Position)]"/>
        <!-- Image width -->
        <xsl:with-param name="imageWidth" select="$record/F[number($recordMapper/FIELD[@Name='ImageNameWidth']/@Position)]"/>
        <!-- Image height -->
        <xsl:with-param name="imageHeight" select="$record/F[number($recordMapper/FIELD[@Name='ImageNameHeight']/@Position)]"/>
        <!-- Mark width-->
        <xsl:with-param name="markWidth" select="ww"/>
        <!-- Mark height -->
        <xsl:with-param name="markHeight" select="hh"/>
    </xsl:call-template>
    <OCCURRENCE_LIST>
        <OCCURRENCE Name="{$record/F[number($recordMapper/FIELD[@Name='ImageName']/@Position)]}" Environment="GroceryStore" Scope="Global">
            <VIEW>
                <TRANSFORM Matrix="1 0 0 1 0 0"/>
            </VIEW>
        </OCCURRENCE>
    </OCCURRENCE_LIST>
</REUSABLE_OBJECT>
<MARK Position="xx yy">
    <OCCURRENCE_REF Ref="{$record/F[number($recordMapper/FIELD[@Name='ImageName']/@Position)]}" Environment="GroceryStore" Scope="Global"/>
</MARK>
```

5. Main Template

```
<!-- Template Entry Point -->
<xsl:template match="/">
    <!-- Template Specific Variables -->
    <!-- (must match with other templates being merged) -->
    <xsl:variable name="sheetWidth" select="WW"/>
    <xsl:variable name="sheetHeight" select="HH"/>
    <xsl:variable name="pageWidth" select="ww"/>
    <xsl:variable name="pageHeight" select="hh"/>
    <xsl:variable name="TemplateName_Mapper" select="//RS/RECORD[@name='TemplateName']"/>
    <PPML>
        <JOB>
            <!-- Page Design -->
            <PAGE_DESIGN TrimBox="0 0 ww hh"/>
                <DOCUMENT>
                    <xsl:for-each select="//R">
                        <PAGE>
                            <xsl:choose>
                                <xsl:when test="F[number($TemplateName_Mapper/FIELD[@Name='Template']/@Position)]='TemplateName'">
                                    <xsl:call-template name="TemplateName">
                                        <xsl:with-param name="record" select="."/>
                                        <xsl:with-param name="recordMapper" select="$TemplateName_Mapper"/>
                                    </xsl:call-template>
                                </xsl:when>
                            </xsl:choose>
                        </PAGE>
                    </xsl:for-each>
                </DOCUMENT>
        </JOB>
    </PPML>
</xsl:template>
```

6. Internal Data

```
<DATA>
    <INTERNAL_DATA>
        <RS>
            <!-- internal name of PPML template -->
            <RECORD name="TemplateName">
                <FIELD Name="Template" Position="1"/>
                <FIELD Name="Background" Position="2"/>
                <FIELD Name="ImageName" Position="3"/>
                <FIELD Name="ImageNameWidth" Position="4"/>
                <FIELD Name="ImageNameHeight" Position="5"/>
                <FIELD Name="TextName" Position="6"/>
            </RECORD>
            <!-- loop of databases description -->
            <R>
                <F>TemplateName</F>
                <F>out_XXX.pdf</F>
                <F>Image.jpg</F>
                <F>width</F>
                <F>height</F>
                <F>text</F>
            </R>
        </RS>
    </INTERNAL_DATA>
</DATA>
```

Figure 17:
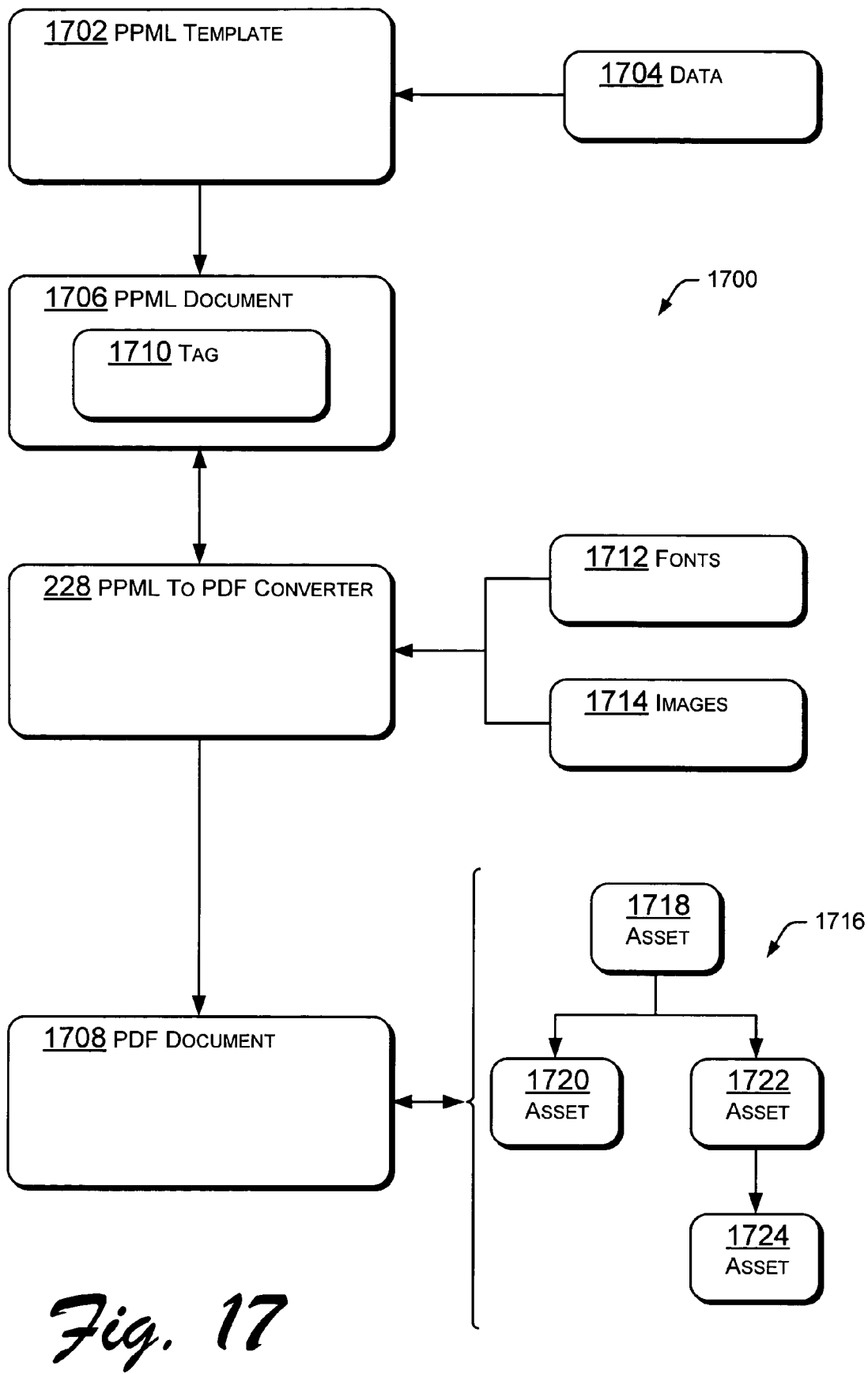
FIG. 17 is a block diagram illustrating an exemplary implementation of a system for converting PPML documents to PDF documents.

FIG. 17 is a block diagram illustrating an exemplary implementation of a system 1700 for converting PPML documents to PDF documents. PPML to PDF conversion allows PPML print jobs to be printed on printers not accepting PPML input—typically lower-end printers (e.g. Hewlett-Packard DesignJet and LaserJet printers), which accept PDF print jobs, but which are not configured to accept PPML print jobs. Additionally, PPML to PDF conversion allows the author of a PPML document or template to translate the PPML back into PDF, to check the accuracy of the PPML document, to visualize the documents at any point within a PPML workflow, or to support the simulation of printing on a press by adding the right printing conditions.

A PPML template 1702 maybe constructed as seen above, or in any conventional manner. Content or data 1704, such as text, images, fonts, etc., may be added to the template 1702, thereby forming a merged PPML document 1706.

A PPML to PDF converter 228 is configured to interpret the merged PPML document 1706, and to create a PDF document 1708. An exemplary PPML to PDF converter 228 (FIG. 2) is configured to parse the PPML document 1706, and generate a PDF document tree 1716 on which elements of the PPML document will be directly translated into PDF objects.

When a PPML tag 1710 refers to an external object, like fonts 1712 or images 1714, the converter 228 will un-marshal that PPML instance to allow insertion within the PDF document 1708. For example, objects 1718-1724, within the PDF document tree 1716, could have been formed in this manner.

FIG. 18 is a block diagram illustrating exemplary detail of the PPML to PDF converter 228. A PPML document interpretation component 1802 is configured to open the PPML document and interpret the merged PPML document 1706 (FIG. 17) to create the PDF document 1708 (FIG. 17). A parsing and tagging component 1804 is configured to parse the PPML document 1706, to locate various features. For example, the parsing component 1804 is configured to locate PPML global impositions and references to assets.

A PPML SOURCE_TYPE resolving component 1806 is configured to resolve, for objects within the PPML document 1706, the PPML SOURCE_TYPE class. This allows a PDF object to be translated by a translation component 1808 according to the PPML SOURCE_TYPE class. In one embodiment of the translation component 1808, a PDF object will be translated within a PdfTemplate as a function of the type of assets found and tagged when parsing the PPML structure. The implementation of the PdfTemplate object also supports caching of the objects on the PdfTemplate to optimize the PDF structure. Caching of objects reduces the need to replicate images or other data within the PDF template structure. Accordingly, all of the occurrences of objects do not have to be replicated and the PdfTemplate is made more optimal.

A PDF tree-generating component 1810 is configured to generate a PDF tree 1716 (FIG. 17) according to the PPML structures revealed by the parsing component 1804. The PDF tree generation could be recursive, and could be used to optimize the PDF document. For example, an A4 template could be configured independently, or could be configured as the sum of two A6 templates. Similarly, an A3 template could be configured independently, or could be configured as the sum of two A4 templates. And still further, an A3 template can be configured as the sum of four A6 templates. Accordingly, the recursive tree structure in a PPML document may be converted into a similar recursive tree structure in a PDF document, using the PdfTemplate structure. Such a conversion may result in a more compact PdfTemplate.

An un-marshalling component 1812 is configured to un-marshal PPML instances, which may then be embedded into the PDF document. For example, where the parsing component 1804 has revealed tags 1710 within the PPML document indicating external objects, such as PDF files, fonts 1712 or images 1714, the un-marshalling component 1812 un-marshals that PPML instance to embed an object (e.g. fonts, images or PDF files) into the PDF document.

A SourceResolver interface component 1814 is configured to resolve references to assets during the course of translating the PPML document into a PDF document. Accordingly, the SourceResolver identifies the object or asset, and using an InputSource, puts it into the PPML specific file. Ultimately, this allows the PPML file to be converted to a PDF file for printing. For example, the SourceResolver component 1814 is configured to, resolve an asset such as an image, (e.g. hello.jpg) into an InputSource object, using a PPML structure. An exemplary PPML structure is:

```
<SOURCE Format= "image/jpeg" Dimensions= "842 1190">
    <EXTERNAL_DATA_ARRAY Src= "hello.jpg"/>
</SOURCE>
```

A FontResolver interface component 1816 is configured to resolve fonts using a manner of operation similar to the SourceResolver interface component 1814. For example, a PPML structure may be used to translate the "ArialMT" asset into an iText font representing a given TTF font, i.e. the ArialMT.ttf font. An exemplary PPML structure to translate the "ArialMT" asset is:

```
<text dx= "20" dy= "20"
    font-size= "30"
    font-family= "ArialMT">Arial</text>
```

An OccurrenceStore Interface component 1818 allows reutilization of PPML objects i.e. REUSABLE_OBJECT_TYPE instances, within the scope defined (e.g. "global" scope). The reutilization process reserves a space in cache memory for an object. Such a reservation avoids a need to reload to the object each time, thereby speeding operations in which the object is needed. An exemplary PPML structure which allows reutilization of the PPML global objects is:

```
<REUSABLE_OBJECT>
    <OBJECT Position= "0 0">
        <SOURCE 'Format= "application/pdf" Dimensions= "842 1190">
            <EXTERNAL_DATA_ARRAY Src= "A3.pdf"/>
        </SOURCE>
    </OBJECT>
    <OCCURRENCE_LIST>
        <OCCURRENCE Name= "bg" Scope="Global" Environment= test1"/>
    </OCCURRENCE_LIST>
</REUSABEL_OBJECT>
```

An ImpositionStore interface component 1820 allows reutilization of PPML global impositions, i.e., IMPOSITION_TYPE instances. Reutilization of PPML global impositions may be stored in memory. For example, rotations, rearrangements, etc. which are repeatedly performed may be stored in memory to prevent the need to reload the associated impositions repeatedly. An exemplary PPML structure which allows reutilization of the PPML global impositions is:

```
<IMPOSITION Rotation= "90" Name= "2x1"
    Environment= "test1" Scope= "Global">
    <SIGNATURE PageCount= "2" Ncols= "2" Nrows= "1" />
    <CELL PageOrder= "s" Face= "Up" Col= "1" Row= "1" />
</SIGNATURE>
</IMPOSITION>
```

Figure 19:
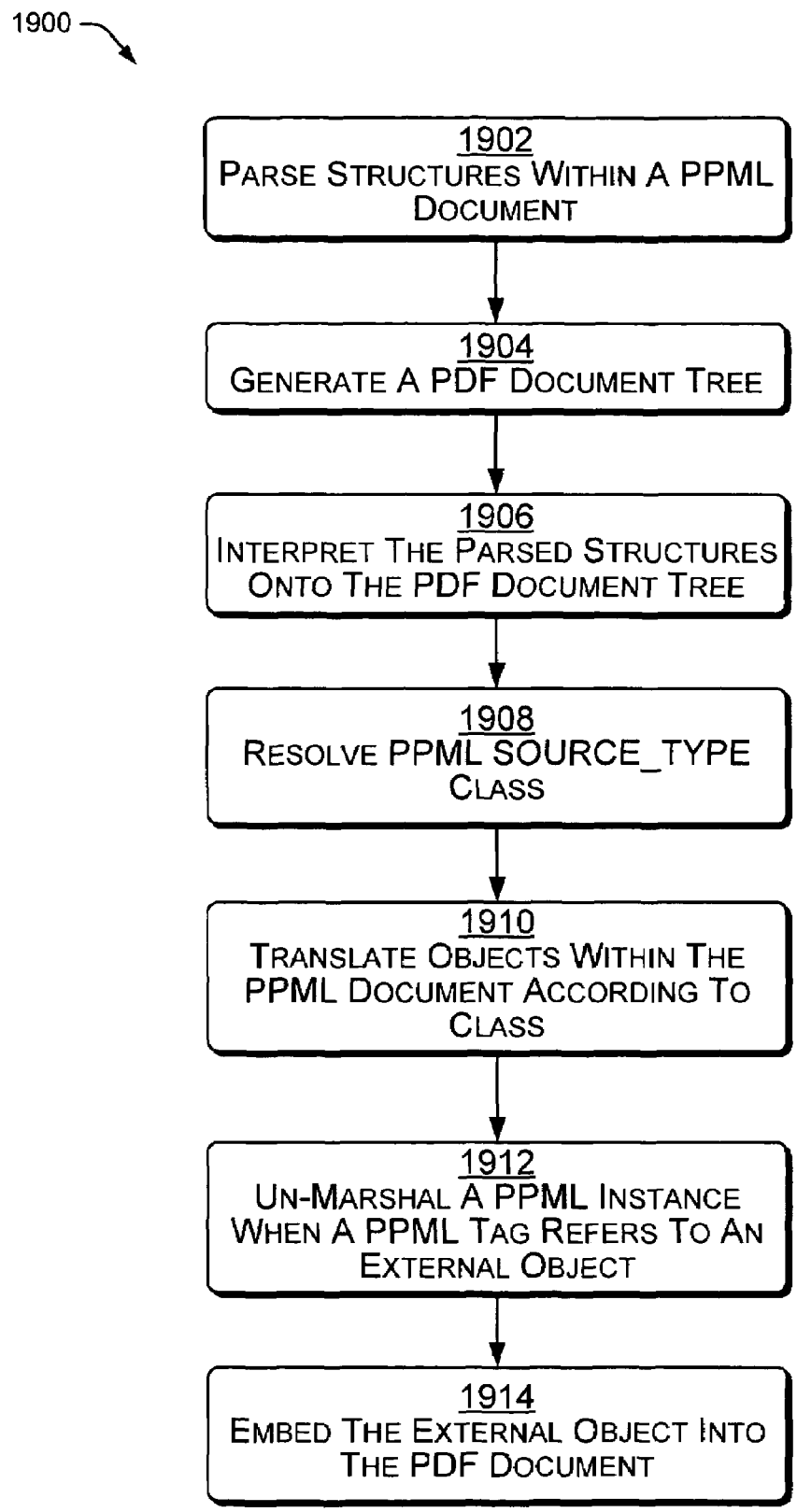
FIG. 19 is a flow diagram that describes exemplary PPML to PDF conversion.

FIG. 19 is a flow diagram 1900 that describes an exemplary conversion of a PPML document into a PDF document. At block 1902, structures within the PPML document are parsed. For example, the parsing and tagging component 1804 may be used to parse the PPML document. At block 1904, a PDF document tree 1716 (FIG. 17) is generated. This may be performed by the PDF tree generating component 1810 (FIG. 18). As seen in FIG. 17, the PDF document tree 1716 includes one or more assets 1718-1724. At block 1906, the parsed structures from the PPML document are interpreted, thereby locating the resulting data on the PDF document tree. Such translation may be performed by the translation component 1808 of FIG. 18.

At block 1908, the SOURCE_TYPE class of objects within the PPML document is resolved. This may be performed by the SourceResolver 1814 of FIG. 18. At block 1910, objects within the PPML document are translated according to the PPML SOURCE_TYPE class.

At block 1912, when a PPML tag refers to an external object, a PPML instance is un-marshaled. As seen above, un-marshalling may be performed by the un-marshalling component 1812 of FIG. 18. At block 1914, the external object is embedded into the PDF document.

Figure 20:
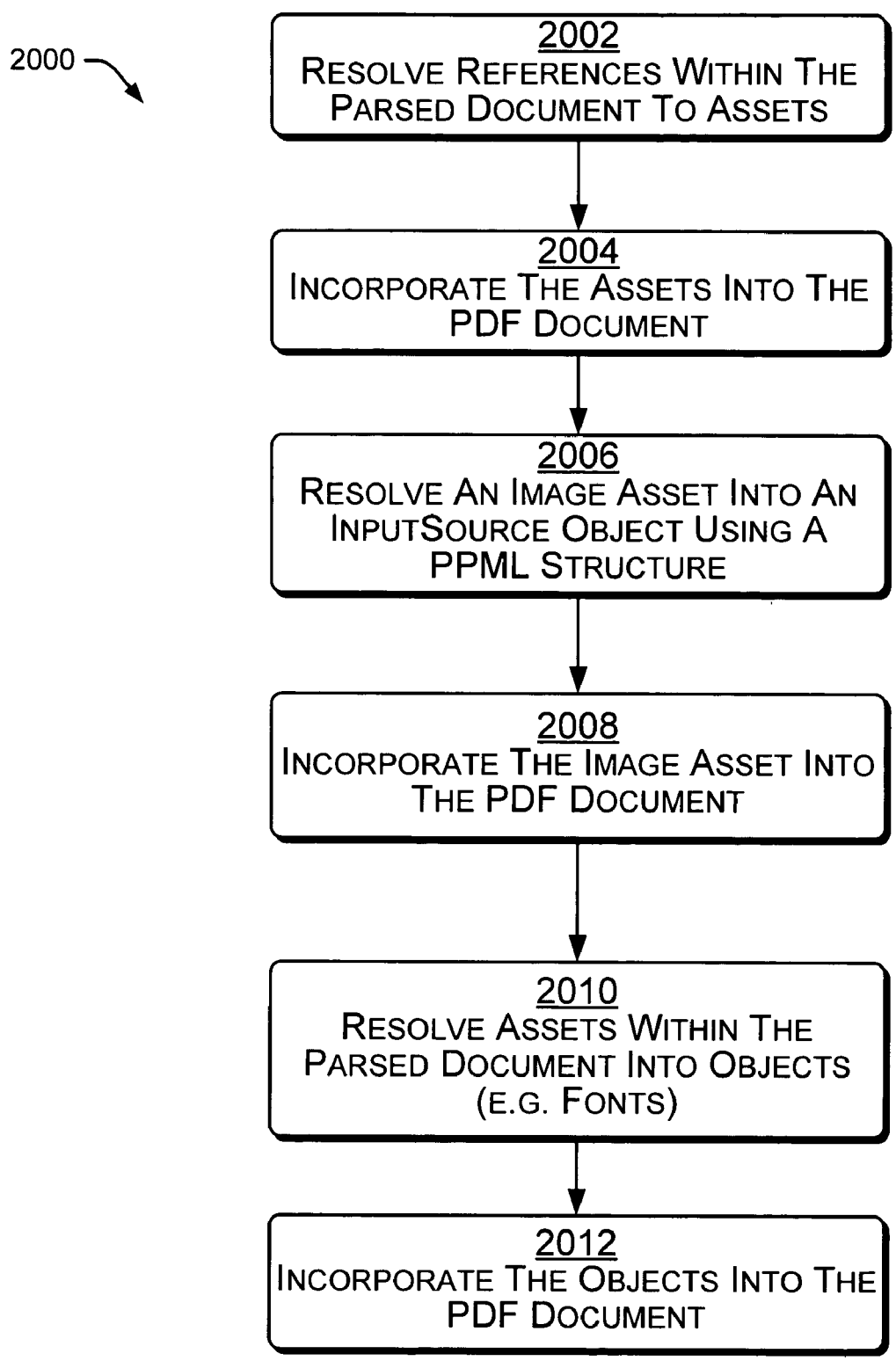
FIGS. 20-21 are flow diagrams which describe aspects of PPML to PDF conversion.

FIG. 20 is a flow diagram illustrating additional aspects 2000 of PPML to PDF conversion. Not all blocks are required for any particular conversion, and in some applications the order of block utilization may be altered. At block 2002, references within a parsed PPML document are resolved, thereby forming assets.

At block 2004, the assets are incorporated into the PDF document. For example, at block 2006, an image asset is resolved into an InputSource object using a PPML structure. As seen above, in one implementation, the SourceResolver 1814 is configured to resolve an image asset into an InputSource object. At block 2008, the image asset is incorporated into the PDF document. As a further example of how assets are incorporated into the PDF document, at block 2010, assets within a parsed PPML document are resolved into objects (e.g. fonts). As seen above, in one implementation, the FontResolver 1816 is configured to resolve a font asset much as the SourceResolver 1814 resolves image assets. At block 2012, the objects are incorporated into the PDF document.

Figure 21:
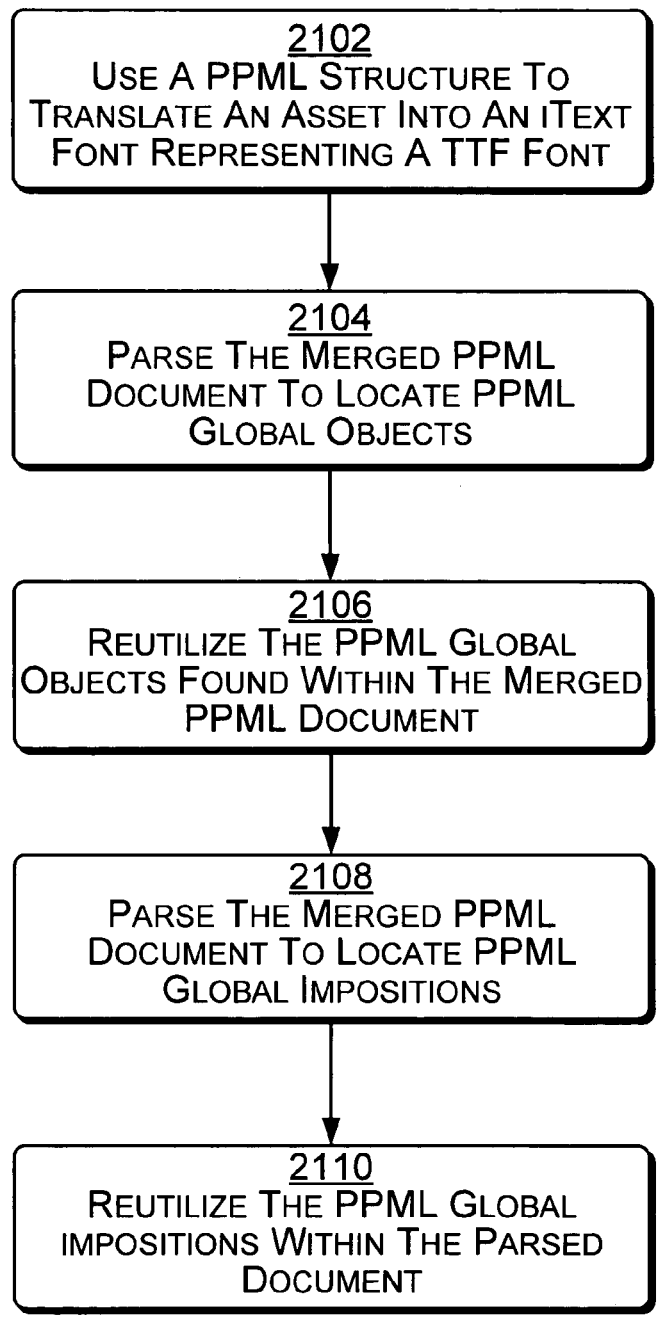

FIG. 21 is a flow diagram illustrating additional aspects 2100 of PPML to PDF conversion. Not all blocks are required for any particular conversion, and in some applications the order of block utilization may be altered. At block 2102, a PPML structure is used to translate an asset into an iText font representing a TTF font. In an exemplary implementation, this functionality may be performed by the FontResolver 1816 of FIG. 18.

At block 2104, the merged PPML document 1706 (FIG. 17) is parsed to locate global objects. In an exemplary implementation, the parsing may be performed by the parsing component 1804 of FIG. 18. At block 2106, the PPML global objects found within the PPML document are reutilized. In an exemplary implementation, the OccurrenceStore 1818 is configured to reutilize the global objects.

At block 2108, the merged PPML document 1706 (FIG. 17) is parsed to locate global impositions. At block 2110, the PPML global impositions found within the PPML document are reutilized. In an exemplary implementation, the ImpositionStore 1820 is configured to reutilize the global impositions.

Although the above disclosure has been described in language specific to structural features and/or methodological steps, it is to be understood that the appended claims are not limited to the specific features or steps described. Rather, the specific features and steps are exemplary forms of implementing this disclosure. For example, while actions described in blocks of the flow diagrams may be performed in parallel with actions described in other blocks, the actions may occur in an alternate order, or may be distributed in a manner which associates actions with more than one other block. And further, while elements of the methods disclosed are intended to be performed in any desired manner, it is anticipated that computer- or processor-readable instructions, performed by a computer and/or processor, typically located within a workstation, print server or printer, reading from a computer- or processor-readable media, such as a ROM, disk or CD ROM, would be preferred, but that an application specific gate array (ASIC) or similar hardware structure, could be substituted.

The invention claimed is:

1. A processor-readable medium comprising processor-executable instructions for processing a PDF (portable document format) document to produce a PPML (personalized print markup language) template, the processor-executable instructions comprising instructions for:
   opening the PDF document;
   converting a PDF element within the PDF document into a variable object, wherein converting the PDF element within the PDF document into the variable object comprises further instructions for:
      providing a tool for operation by a user; and
      responding to operations of the tool which result in a selection of a portion of the PDF document to be associated with the variable object, wherein responding to operation of the tool comprises further instructions for:
         providing the user with a first set of properties for graphical objects and a second set of properties for text objects;
         allowing the user to adjust the properties; and
         governing conversion of the PDF element within the PDF document into the variable object according to the properties;
   selecting a macro containing rules governing operation of the variable object;
   configuring the PPML template to include a definition of the variable object, the macro and a version of the PDF document, wherein the version of the PDF document is configured as a background element within the PPML template;
   saving the PPML template as an optimized tree-structure; and
   using a PPML to PDF converter to produce an optimized PDF document from the PPML template wherein subsequent instances of a PDF object will be substituted with references to an initial instance of the PDF object.

2. The processor-readable medium as recited in claim 1, wherein the selection of the portion of the PDF document comprises further instructions for:
   selecting a graphical image within the PDF document.

3. The processor-readable medium as recited in claim 1, wherein the selection of the portion of the PDF document comprises further instructions for:
   selecting text within the PDF document.

4. The processor-readable medium as recited in claim 1, wherein selecting the macro comprises further instructions for:
   configuring the macro as an XML (Extensible Markup Language) file containing macros described by an XSL (Extensible Style Language) schema.

5. The processor-readable medium as recited in claim 1, wherein selecting the macro comprises further instructions for:
   configuring an external XSLT (Extensible Markup Language Template) macro file to contain the rules governing the operation of the variable object.

6. The processor-readable medium as recited in claim 1, wherein selecting a macro comprises further instructions for configuring the macro file to:
   regulate text scaling within the variable object;
   regulate text wrapping within the variable object;
   regulate image scaling within the variable object; or
   regulate image cropping within the variable object.

7. The processor-readable medium as recited in claim 1, comprising further instructions for:
   modifying the PDF document to include marking elements to link the variable object with the macro.

8. The processor-readable medium as recited in claim 1, comprising further instructions for:
   referencing the PDF document as a background PPML asset from within the PPML template;
   listing, within the PPML template, fonts required within the PPML template;
   configuring the PPML template to include at least one macro; and
   defining the variable object as REUSABLE within the PPML template to allow reuse of the variable object when references indicating such use appear.

9. The processor-readable medium as recited in claim 1, comprising further instructions for:

presenting a user with a choice between .pplm and .ppmlt as an extension for addition to a file name; and saving a PPML document resulting from the PDF document under the file name with the extension.

10. A computer system, comprising:

a processor;

a memory connected to the processor;

means for opening a PDF (portable document format) document;

means for converting a PDF element within the PDF document into a variable object, wherein the means for converting the PDF element within the PDF document into the variable object comprises:

a variable object creation tool configured for operation by a user, wherein operation of the variable object creation tool allows the user to select the PDF element, wherein the variable object creation tool comprises:

a graphical user interface to provide the user with a first set of properties for graphical objects and a second set of properties for text objects;

wherein the graphical user interface allows the user to adjust the properties; and wherein the graphical user interface governs conversion of the PDF element within the PDF document into the variable object according to the properties;

means for generating a macro to contain rules governing use of the variable object;

means for configuring a PPML (personalized print markup language) template to include the variable object, the macro and at least portions of the PDF document, wherein the at least portions of the PDF document is configured as a background within the PPML template;

means for saving the PPML template as an optimized tree-structure; and means for producing an optimized PDF document from the PPML document wherein subsequent instances of a PDF object will be substituted with references to an initial instance of the PDF object.

11. The system as recited in claim 10, wherein the variable object creation tool is configured for selecting a graphical image within the PDF document.

12. The system as recited in claim 10, wherein the variable object creation tool is configured for selecting text within the PDF document.

13. The system as recited in claim 10, wherein the means for generating the macro configures the macro as an XML (Extensible Markup Language) file containing macros described by an XSL (Extensible Style Language) schema.

14. The system as recited in claim 10, wherein the means for generating the macro configures an external XSLT (Extensible Style Language Template) macro file to contain the rules governing the use of the variable object.

15. The system as recited in claim 10, wherein the means for generating the macro to contain rules governing use of the variable object creates rules comprising:

rules for regulating text scaling within the variable object;

rules for regulating text wrapping within the variable object;

rules for regulating image scaling within the variable object; and rules for regulating image cropping within the variable object.

16. The system as recited in claim 10, additionally comprising: means for modifying the PDF document to include marking objects to link the variable object with the macro.

17. The system as recited in claim 10, further comprising:

means for referencing the PDF document as a background PPML asset from within the PPML template;

means for listing, within the PPML template, fonts required within the PPML template;

means for configuring the template to include at least one macro file used by the template; and means for defining the variable object as REUSABLE within the PPML document to allow reuse of the variable object when references indicating such use appear.

* * * * *